United States Patent Office 2,735,047
Patented Feb. 14, 1956

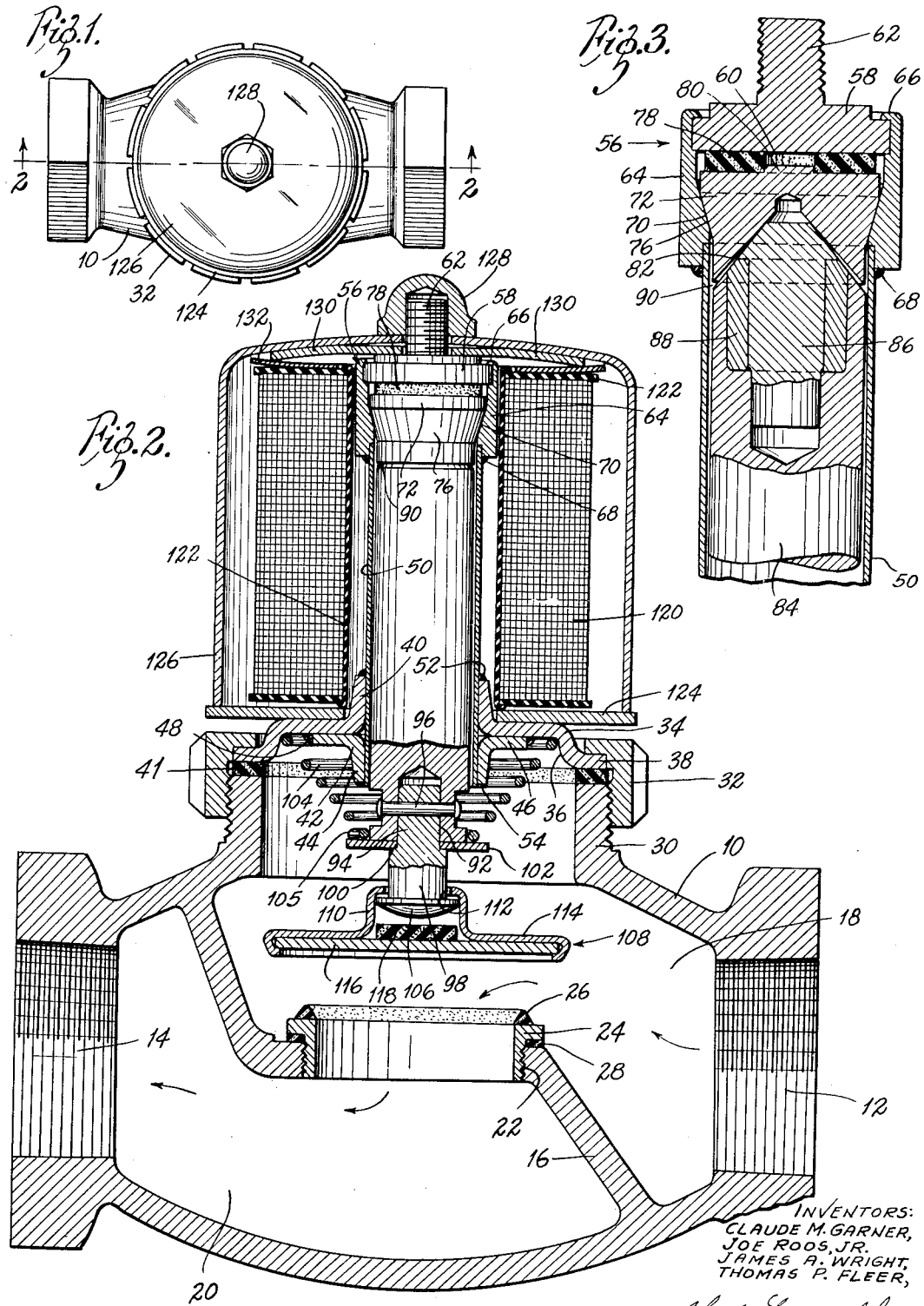

2,735,047
ANTIVIBRATION SOLENOID STRUCTURE

Claude M. Garner, Clayton, Joe Roos, Jr., St. Louis, James A. Wright, Webster Groves, and Thomas P. Fleer, St. Louis, Mo., assignors to Missouri Automatic Control Corporation, St. Louis, Mo., a corporation of Missouri Application October 2, 1953, Serial No. 383,842

4 Claims. (Cl. 317—186)

This invention relates to A. C. operated solenoid valves and to a construction thereof which is particularly efficient and substantially noiseless in operation.

In conventional constructions of gravity or spring returned, A. C. operated, solenoid valves, an inward stop member of magnetic material is provided which, together with a shading means, holds the solenoid plunger in a fixed inward position when energized so that it does not vibrate longitudinally with A. C. current reversals. In operation, however, the plunger attains considerable velocity when energized and strikes the metal stop member with considerable impact resulting in a noise which, in certain applications of the device, is highly objectionable. For example, when solenoid actuated gas valves are connected in metal gas lines this noise is amplified so as to be quite objectionable in domestic use. Further, the meeting of the valve with its valve seat upon closing also results in objectionable noise when these members are constructed of metal or hard material.

The primary object of the present invention is to provide a generally new and improved A. C. operated solenoid valve which is particularly efficient and substantially noiseless in operation.

Another object is to provide an A. C. solenoid having a cushioned stop member of magnetic material for limiting the inward travel of the plunger.

Another object is to provide an A. C. solenoid having a plunger stop member of magnetic material which is longitudinally movable upon impact in a sleeve of magnetic material and is normally biased in a plunger stopping position by resilient means.

Another object is to provide such an impact absorbing stop member having a tapered portion and a tapered seat on which it is normally held by resilient means.

Another object is to provide an A. C. solenoid having improved means at one end of the plunger for shading a portion of the flux passing therethrough so that said plunger end is more constantly held against a stop member of magnetic material.

These and other objects and advantages which appear from the following description and accompanying drawing are attained in the present invention.

In the drawing:

Fig. 1 is a plan view of a solenoid gas valve constructed in accordance with the present invention;

Fig. 2 is an enlarged vertical section of the valve shown in Fig. 1 and is taken on line 2—2 of Fig. 1;

Fig. 3 is an enlarged fragmentary vertical section showing the upper end of the solenoid plunger and its guide sleeve, and the cushioned plunger stop member.

The device comprises a valve body 10 having an inlet 12, an outlet 14, and a partition 16 defining an inlet chamber 18 and an outlet chamber 20. The partition 16 has a port 22 therein which is screw threaded to receive a threaded valve seat member 24. The seat member 24 is of metal and has bonded to its upper surface, by a heat process, a ring 26 of synthetic rubber which preferably has a triangular cross-sectional configuration as shown. The ring 26 is constructed of a commercially available Buna-N base synthetic rubber, which is highly resistant to hydrocarbon compounds, having a Shore Durometer hardness of between 40 and 45. A pliable gasket 28 of suitable material is provided between the seat member 24 and the valve body.

The upper portion of valve body 10 is provided with a circular hollow extension 30 which is externally threaded to receive a circular nut 32. Attached to the body extension 30 by means of the nut 32 is a circular support member 34 of magnetic material which supports the solenoid actuator. The member 34 is formed so as to provide an annular recess 36, a peripheral flange portion 38 by means of which it is attached to the valve body, and a central, upwardly extending, hollow, cylindrical portion 40. A pliable sealing gasket 41 is provided between the member 34 and the valve body. Rigidly attached to the under side of the support member 34 is a smaller circular member 42 of magnetic material having a downwardly extending, hollow, cylindrical portion 44 and a flange portion 46. The member 42 is attached to member 34 by welding at the periphery of its flange, as indicated at 48, and its hollow, cylindrical portion 44 is concentric with the hollow, cylindrical portion 40 and of the same internal diameter. It is to be understood that the members 34 and 42 may be formed integral, that is turned from one piece of stock, however, in the preferred form, the pieces are more economically formed separately in a press and welded together, as shown.

A vertically arranged plunger guide sleeve 50 of nonmagnetic metal is fitted at its lower end into the cylindrical portions 40 and 44 and rigidly attached therein as by hard soldering at 52 and 54. Fitted over the upper end of guide sleeve 50 is a hollow closing plug 56 of magnetic material. The closing plug 56 is of two piece construction comprising a head portion 58 having an extensive, flat, lower surface 60 and an upwardly extending, threaded, stud portion 62, and a downwardly extending, tubular portion 64, the upper end of which is counterbored to receive the head portion 58 and is then formed over, as indicated at 66, so as to provide, with the head portion, a rigidly assembled unit. The tubular portion 64 is also provided with a counterbore at its lower end in which is received the upper end of guide sleeve 50, and the sleeve 50 is attached thereto as by hard soldering as indicated at 68.

Arranged for limited longitudinal movement in the tubular portion 64 is a floating plunger stop member 72 of magnetic material, having a tapered portion 76 substantially corresponding to an internal taper 70 in the tubular portion 64 so that the downward movement of the stop member is limited by engagement of these tapered surfaces. Between the upper end of the stop member 72 and the flat lower surface 60 of the closing plug head portion 58 there is interposed a sponge rubber washer 78, constructed of a commercially available synthetic sponge rubber of high compressibility and resistance to hydrocarbon fuels. The upper end of the floating stop member 72 is provided with a slightly raised cylindrical boss portion 80 which enters the hole in the sponge rubber washer 78, thereby to retain it centrally with respect to the stop member. The sponge rubber washer 78, it will be seen, is somewhat smaller in diameter than the internal diameter of the tubular portion 64 at that point so as to provide space for displacement of the washer upon being compressed. The lower end of the floating stop member 72 is provided with a conical recess 82.

In the assembly of the guide sleeve 50, the floating stop member 72, the sponge rubber washer 78, and the two portions 58 and 64 of the closing plug; the sleeve 50 is first attached to the lower end of tubular portion 64 by hard soldering, as indicated at 68. The floating stop member 72 is then entered into the tubular plug portion 64 from the top, after which the sponge rubber washer 78 is inserted and then the head portion 58 of the closing plug is pressed into place in its counterbore and crimped in, as indicated at 66. The vertical dimensions of the parts are such that the sponge rubber washer is under compression when assembled so as to bias the stop member 72 in its downward position with its tapered portion 76 in contact with the tapered inner wall 70 of the member 64.

Loosely fitted in the non-magnetic guide sleeve 50 is a solenoid plunger 84 of magnetic material having its upper end longitudinally bored to receive the inner end of a plunger head plug 86 of magnetic material and counterbored to receive a shading ring 88 of non-magnetic, but conducting, material such as copper or aluminum. The shading ring 88 and the inner end of plug 86 are press fitted in the end of the solenoid plunger. After assembly of these members, the upper end of the plunger is turned to a frusto-conical shape. It will be noted that the included angle between the tapered sides of the conical recess 82 is somewhat greater than the included angle between the tapered sides of the conical end of the plunger, thereby to provide an air gap 90 between the outer annular portion of the plunger and the stop member 72. It will be understood that by varying this air gap in the main flux path, which at this point is the outer annular portion of the plunger, a greater or lesser amount of flux will be forced to pass through the shaded plug 86 and, therefore, greater or lesser amounts of flux will be shifted in phase with respect to the flux flowing through the main flux path.

Inasmuch as the calibration of this air gap or reluctance at 90 is quite critical to achieving the optimum in constant flux flow for holding the plunger constantly against its stop member, the means of providing this air gap by employing differential tapers between the plunger end and recess is an important feature of the present invention. In quantity production it is quite simple and economical to hold these tapers to precise angles, and inasmuch as they are in direct contact, no other dimensional tolerances are introduced. The combination of the conical recess in the stop member and the frusto-conical plunger end also have, of course, the additional important function of centering the upper or inner end of the plunger in its guide sleeve 50, thereby to prevent lateral movement of this end of the plunger with A. C. current reversals.

The lower end of the plunger 84 has a longitudinal bore 92 which receives one end of a valve stem 94 which is retained in the plunger by a cross pin 96. The stem 94 is provided with an enlarged diameter portion 98 and a shoulder 100 which retains a washer 102 against the lower end of the plunger. The washer 102 is of sufficient diameter to provide a projecting flange at the end of the plunger against which bears the smaller lower end of a conically wound spring 104. Spring 104 is provided with an end loop 105 at its lower small end which is formed eccentrically with the remainder of the spring and which snugly fits the lower end of the plunger, so as to cause the lower end of the plunger to be biased laterally against one side of its guide sleeve 50. The upper end of spring 104 is retained in the concentric recess 36. This arrangement is more fully shown and described in Patent No. 2,650,617, issued to Joseph A. Wasser, September 1, 1953. This provision eliminates lateral chattering of the lower end of the plunger against the wall of its guide sleeve 50.

The exterior end of valve stem 94 is provided with a rounded head 106 on which is supported a valve 108. Valve 108 comprises an inverted cup-shaped member 110 having a central perforation 112 which loosely fits the portion 98 of the valve stem. The cup-shaped member 110 is further provided with a wide flange portion 114 against the lower surface of which is positioned a flat, metal, valve disc 116. The disc 116 is attached to flange 114 by the forming over of the periphery of the flange. It will be noted that, due to the loose fit of the cup member 110 on the valve stem, the valve may swivel freely and that the depth of the cup portion provides a space between the valve head 106 and the valve disc 116. A sponge rubber disc 118 bonded to the upper surface of the valve disc 116 eliminates the noise of metal to metal contact as the plunger falls and the valve is seated.

Surrounding the sleeve 50 is a winding 120 carried on a compressed fibre spool 122. The winding 120 is enclosed in a casing comprising a centrally perforated circular disc member 124 of magnetic material which overlays the support disc 34 to form the bottom of the enclosure and an inverted cup member 126 of magnetic material, the rim of which is firmly pressed against the disc 124 by an acorn nut 128 on the stud 62 which clamps the bottom of cup member 126 against the sleeve closure member 56. A centrally perforated disc 130 of magnetic material underlaying the bottom of the inverted cup member 126 bears firmly against the closing plug 56 and the bottom of the cup member to insure a continuous flux path between these members. A formed spring washer 132 between the disc 130 and the winding spool 122 resiliently holds the winding in position when the nut 128 is tightened.

*Operation*

The device is shown in Figs. 2 and 3 in an energized, valve open position with the upper frusto-conical end of the solenoid plunger engaging the conical recess in the stop member. If the winding 120 is now de-energized, the plunger and valve assembly will fall due to gravity and to the urging of spring 104. The impact of the valve with its seat and the valve stem head with the valve is rendered substantially noiseless due to the material of which seat 26 is constructed and due to the soft disc 118. In the usual constructions which are intended to eliminate valve closing noise wherein a soft valve facing and a hard seat is employed, annular depressions or grooves tend to form in the soft valve facing, and in the case of a freely swiveling valve, as shown in applicant's construction, these grooves do not always register with the seat when the valve closes and this results in a leaking valve. However, by constructing the valve seat of soft material and by constructing the valve disc of suitable hard material, as applicant has done, this problem in constructing a noiseless valve is solved.

When the valve is in a closed position and the coil 120 is energized, the plunger 84 moves rapidly upward. During a small initial portion of its upward movement, the plunger travels free of the valve, that is, until the valve stem head 106 engages the bottom of the valve cup portion 110. This initial free movement of the plunger allows the plunger to accelerate to some degree before the valve is engaged so that the valve is struck a sharp blow in an opening direction thereby to dislodge it in the event any gummy substance causes it to adhere to its seat. After engaging the valve, the plunger continues upward rapidly and strikes the stop member 72 with considerable impact. This impact is effectively absorbed in the sponge rubber element 78. After being struck by the upper end of the plunger, the stop member 72 rebounds due to the elasticity of element 78. The provision of the tapered surfaces on the stop member 72 and in its retaining member 64 reduces the noise incident to this rebound impact to a minimum.

Inasmuch as a constantly varying flux flows laterally from the floating stop member 72 to its retaining member 64, the problem of eliminating the chattering of the stop member against a wall of its retaining member is also solved by the provision of the tapered surfaces on the stop member and the similarly tapered seat in its retaining member. It will be noted that the magnetic flux, gravity, and the compressed sponge rubber washer 78 are all acting downward to hold the stop member 72 on its tapered seat so that, even though the flux acting on the stop member varies from zero to a maximum each half cycle, it does not vibrate so as to cause a chattering noise.

When the frusto-conical upper end of the plunger engages the conical recess in the stop member, the action is that of centering the upper end of the plunger in its guide sleeve 50, thereby to prevent it from chattering against the walls of its sleeve near the upper end. The lower end of the plunger, however, is pressed against the wall of the sleeve by the eccentric end loop on the spring 104, thereby preventing its chattering against the sleeve near that end. As hereinbefore described, the included angle between the tapered surfaces of the frustro-conical plunger end is made slightly less than the included angle between the tapered sides of the conical recess 82 in order to provide a calibrated air gap between the outer annual portions of the plunger end stop member. This difference in included angle is in the order of 2 or 3 degrees but may be made whatever is necessary to force the required flux through the central shaded flux path, provided by the plug 86, so as to result in a substantially constant flux between the plunger head and stop member thereby to constantly hold the plunger against the stop member. It will be understood, of course, that this air gap diminishes at a uniform rate from its maximum, indicated at 90, to zero at the upper end of the plunger. Due to the fact, however, that the differential in included angles is quite small, the air gap above the shading ring is quite small, but nevertheless existent, and reduces substantially the tendency of the plunger to stick due to residual magnetism.

The provision of the hollow cylindrical portions 40 and 44, which extend longitudinally of the guide sleeve 50 at its lower end, substantially reduces the reluctance in the flux path at this point, resulting in a marked increase in the efficiency of the device.

In the foregoing we have described a particularly efficient and noiseless solenoid actuated valve constructed in accordance with the principles of our invention. The foregoing is intended to be illustrative and not limiting, the scope of the invention being set forth in the appended claims.

We claim:

1. In a solenoid, a plunger guide sleeve of non-magnetic material, a plunger slidable in said sleeve, a member of magnetic material at one end of said sleeve and in fixed relationship therewith, a bore in said member concentric with said sleeve, a magnetic plunger stop member movable longitudinally in said bore, said bore and said stop member having corresponding tapered portions which engage when said stop member is moved longitudinally in one direction in said bore, thereby to seat said tapered portion of said stop member in the tapered portion of said bore, and resilient means biasing said stop member on its seat.

2. In a solenoid, a vertical plunger guide sleeve of non-magnetic material, plunger slidable in said sleeve, an inverted cup-shaped closure member of magnetic material fixed to the upper end of said sleeve, a magnetic plunger stop member longitudinally movable in said closure member, said cup-shaped closure member having a tapered internal wall portion forming a tapered seat and said plunger stop member having a similarly tapered portion adapted to engage said seat as it is pressed outward of said closure member, and a sponge rubber disc between said stop member and the closed end of said closure member of sufficient thickness to bias said stop member on its seat.

3. In a solenoid, a vertical plunger guide sleeve of non-magnetic material, a plunger slidable in said sleeve, said plunger having a conical upper end and having a concentric shading ring of smaller diameter than said plunger embedded in said upper end, a resiliently mounted plunger stop member of magnetic material at the upper end of said sleeve having a conical recess therein adapted to receive the conical end of said plunger thereby to center it in its guide sleeve, and said conical recess having a slightly greater apex angle than that of said conical plunger end, thereby to provide an annual air gap between the outer peripheral areas of said plunger and said plunger stop member.

4. In a solenoid, a vertical plunger guide sleeve of non-magnetic material, a plunger member slidable in said sleeve having a conical upper end, a plunger stop member of magnetic material at the upper end of said sleeve having a conical recess therein adapted to receive the conical end of said plunger member thereby to center it in its guide sleeve, a concentric shading ring of smaller diameter than said plunger member embedded in one of said members, and the apex angle of said conical recess being slightly greater than that of said conical plunger end thereby to provide an annual air gap between the outer peripheral areas of said members.

References Cited in the file of this patent

UNITED STATES PATENTS

| | | |
|---|---|---|
| 1,226,748 | Burnham | May 22, 1917 |
| 2,043,194 | Eggleston | June 2, 1936 |
| 2,267,411 | McNairy | Dec. 23, 1941 |
| 2,442,599 | Herrick | June 1, 1948 |
| 2,458,123 | Wasserlein | Jan. 4, 1949 |
| 2,474,742 | Kuhn | June 28, 1949 |